United States Patent [19]
DiRisio et al.

[11] Patent Number: 5,881,330
[45] Date of Patent: Mar. 9, 1999

[54] APPARATUS FOR METERING STRIP OF FILM

[75] Inventors: Anthony DiRisio; Leonard Richiuso; Shannon A. Young, all of Rochester, N.Y.

[73] Assignee: Eastman Kodak Company, Rochester, N.Y.

[21] Appl. No.: 992,851

[22] Filed: Dec. 18, 1997

[51] Int. Cl.[6] .................................................. G03B 1/00
[52] U.S. Cl. ............................................................ 396/399
[58] Field of Search .................................. 396/395, 397, 396/398, 399, 400

[56] References Cited

U.S. PATENT DOCUMENTS

| | | |
|---|---|---|
| 1,403,106 | 1/1922 | Pittman . |
| 3,724,348 | 4/1973 | Monks . |
| 4,746,943 | 5/1988 | Kohl . |
| 5,023,640 | 6/1991 | Diehl . |
| 5,357,302 | 10/1994 | Kawamura et al. . |
| 5,555,053 | 9/1996 | Stephenson . |

Primary Examiner—Howard B. Blankenship
Attorney, Agent, or Firm—Susan L. Parulski

[57] ABSTRACT

A metering apparatus for metering a strip of film along a film transport path in a camera. The apparatus provides for the initial positioning, metering, and rewinding of the filmstrip. A movable metering member has at least one tooth adapted to engage a perforation disposed on the strip of film. A first and second tracking pin disposed on the metering member engages a first and second track, respectively, for slidable and pivotable movement therealong. A resilient member biases the metering member toward the film transport path.

6 Claims, 10 Drawing Sheets

APPARATUS FOR METERING STRIP OF FILM

FIELD OF THE INVENTION

The present invention is directed to the field of photography. More particularly, the present invention is directed to an apparatus for advancing and metering a strip of film in a frame by frame manner.

BACKGROUND OF THE INVENTION

A strip of film is incrementally advanced in a camera to position an unexposed frame relative to an exposure gate for exposure. The accurate advancement and registration of each frame relative to the exposure gate is critical to ensure correct frame-to-frame spacing and avoid an overlap of exposed images.

Various ways have been employed to meter a filmstrip. A common practice of achieving accurate metering is to utilize perforations disposed in the filmstrip, which can be detected to determine the correct positioning for a frame. A well-known conventional system uses a mechanical claw or pawl that detects a perforation corresponding to a next frame, and establishes registration for that frame when the perforation reaches a desired stopping point. Once registration is achieved, it is desirable to provide means to maintain the registration until the advancement of the filmstrip to the next frame so that the filmstrip does not creep out of alignment.

U.S. Pat. No. 4,746,943 relates to a film tracking mechanism having a track and a tracking member moving in a cyclic manner to engage and advance a filmstrip. While such a film tracking mechanism may have achieved a certain degree of success in its particular application, a need continues to exist for a metering apparatus which provides for the thrusting (i.e., initial positioning) of the filmstrip, the metering of the filmstrip, and the rewinding of the filmstrip, without independent mechanisms being required for the retraction of the metering apparatus. Such a metering apparatus should be simple in design and provides for a reduction of the number of mechanical components required within a camera.

SUMMARY OF THE INVENTION

An object of the invention is to provide a mechanically operable metering apparatus.

Another object of the invention is to provide such a metering apparatus which thrusts, meters, and rewinds the filmstrip, without the separate retraction of the metering apparatus.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an apparatus for metering a strip of film. The apparatus comprises a first and second stationary track and a movable metering member having at least one engagement tooth adapted to engage a perforation disposed on the strip of film. A first and second tracking pin disposed on the metering member engage the first and second track, respectively, for slidable and pivotable movement along the tracks. A resilient member biases the metering member toward the film transport path. In a preferred embodiment, the first track defines a continuous loop, while the second track does not define such a continuous loop.

The present invention provides a mechanically operable metering apparatus which is robust and simple in design. An advantageous aspect of the present invention is that it provides for the thrusting, metering, and rewinding of the filmstrip, without independent mechanisms being required for the retraction of the metering apparatus. Few parts are required for the present invention, thereby reducing the number of mechanical components, and accordingly reducing the manufacturing costs of the camera into which the apparatus is incorporated.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
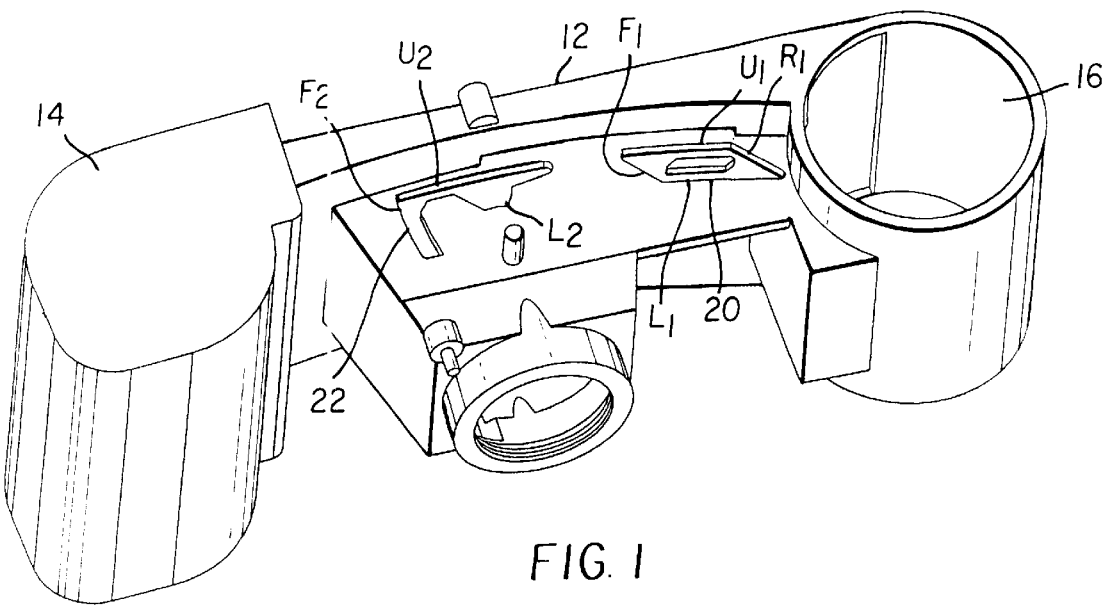
FIG. 1 shows a perspective view of the front and top of a portion of a camera body, including features of the present invention.

The following is a detailed description of the preferred embodiments of the invention, reference being made to the drawings in which the same reference numerals identify the same elements of structure in each of the several figures.

Referring to FIGS. 1 through 4, a metering apparatus 10 is provided to transport and meter a filmstrip F along a film transport path in a camera body 12 between two locations, shown as first chamber 14 and second chamber 16. Metering apparatus 10 comprises a movable metering member 18, a first and second track 20,22, a resilient member 24, and an actuating member or demetering lever 26.

Figure 2:
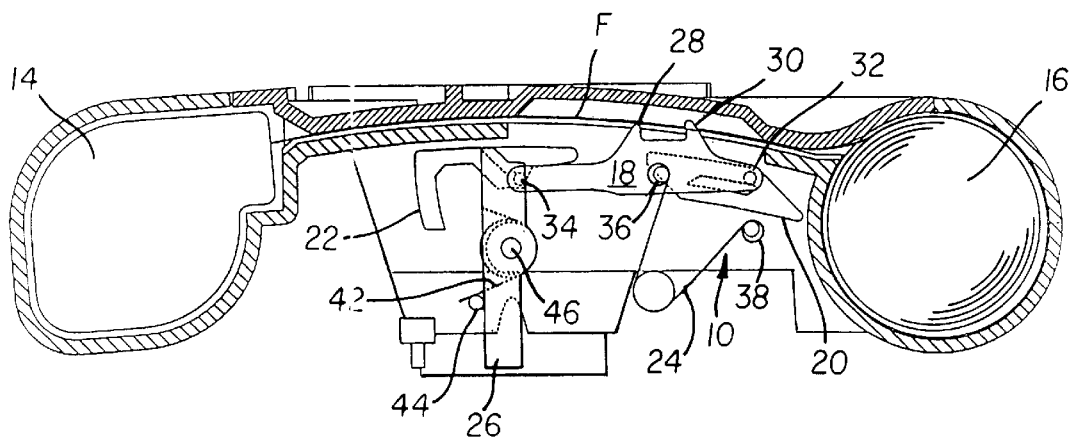
FIG. 2 shows a top view of a camera body, including a metering apparatus in accordance with the present invention.

First and second track 20,22 are stationarily disposed on camera body 12. As illustrated in FIGS. 1 and 2, preferably first track 20 defines a continuous loop while second track 22 defines a slot or channel which is not a continuous loop. First track 20 includes a front surface $F_1$, a rear surface $R_1$, an upper surface $U_1$, and a lower surface $L_1$. Second track 22 includes an upper surface $U_2$, a front surface $F_2$, and a lower surface $L_2$.

Figure 3:
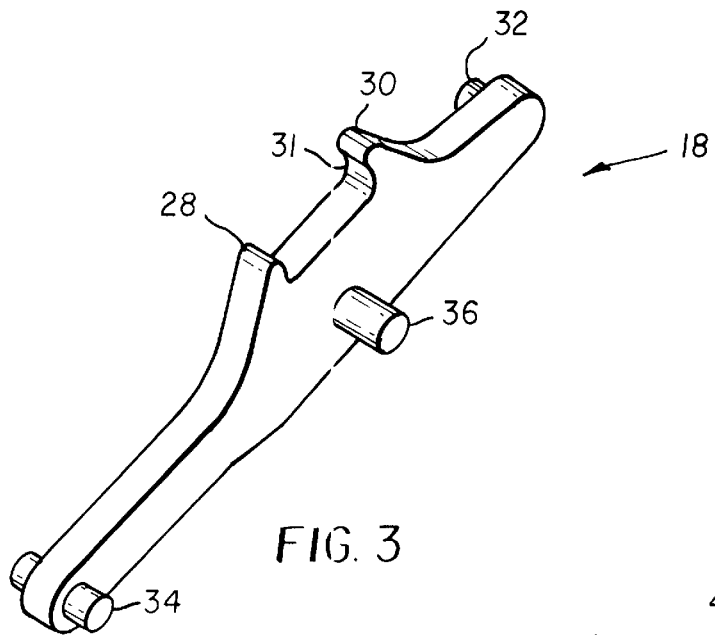
FIG. 3 shows a perspective view of a metering pawl in accordance with the present invention.

As more particularly shown in FIG. 3, metering member 18 includes a first tracking pin 32 and a second tracking pin 34 adapted to engage first and second track 20,22, respectively, for slideable and pivotable movement therealong. Metering member 18 further includes a sensing tooth 28 and a metering tooth 30, each adapted to engage a frame-registering filmstrip perforation. Sensing tooth 28 and metering tooth 30 are each preferably defined by at least one sloped surface; the sloped surfaces being directed toward each other, as illustrated in the figures. The sloped surfaces facilitate the release and engagement of the teeth with the filmstrip's perforations. Another surface 31 of metering tooth 30 is preferably angled to promote mechanical association between metering member 18 and the filmstrip's perforation.

Resilient member 24 biases metering member 18 toward the film transport path. As shown in FIG. 2, resilient member 24 is preferably a spring which is mechanically associated to metering member 18 by a first mounting pin 36 and to camera body 12 by a second mounting pin 38. Mounting pins 36,38 are positioned so as to define a force vector which biases metering member 18 toward the film transport path. A suitable spring force of resilient member 24 permits thrusting of the filmstrip, yet provides appropriate biasing for the engagement of metering member 18 and the filmstrip.

Figure 4A:
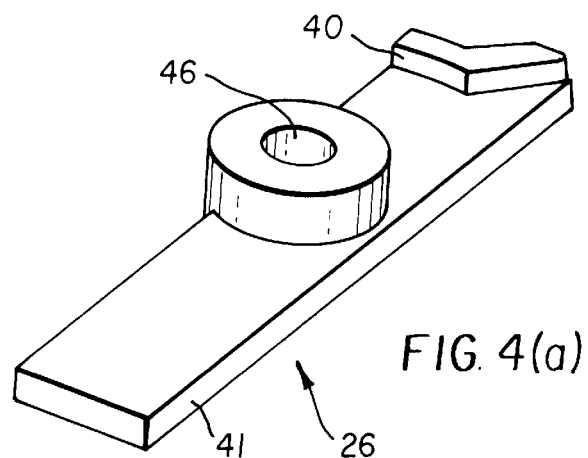
FIGS. 4(a) and 4(b) show, respectively, a top perspective view and a bottom perspective view of a demetering lever in accordance with the present invention.
Figure 4B:
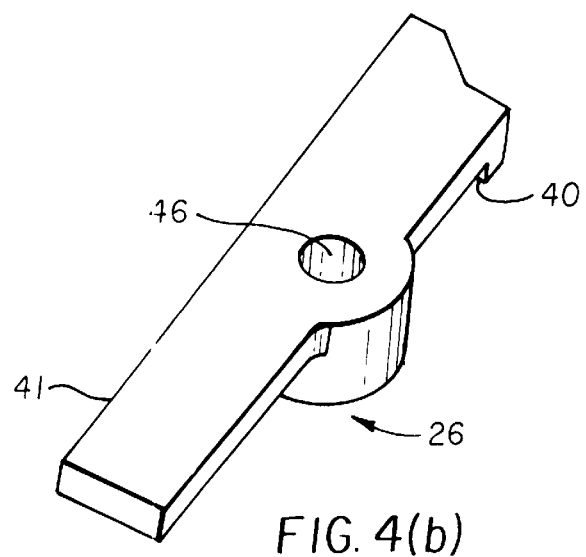

Demetering lever 26, more particularly shown in FIGS. 4(a) and 4(b), includes a blocking surface 40 and an actuating surface 41. A torsion spring 42 biases demetering lever 26 against a stop member 44 to define a rest position. Demetering lever is actuated by manual or automatic means not shown, such as a lever or shutter firing mechanism. Blocking surface 40 is formed as an arc about a center of rotation 46 of demetering lever 26. Such a formation provides a self-locking feature since a force from second tracking pin 34 would be directed through center 46 of demetering lever 26, whereby no net torque would result.

The metering apparatus of the present invention provides for the initial positioning (i.e., thrusting), metering, and rewinding of the filmstrip. The metering apparatus will now be described for each of these operations.

Thrusting of the Filmstrip

Figure 5A:
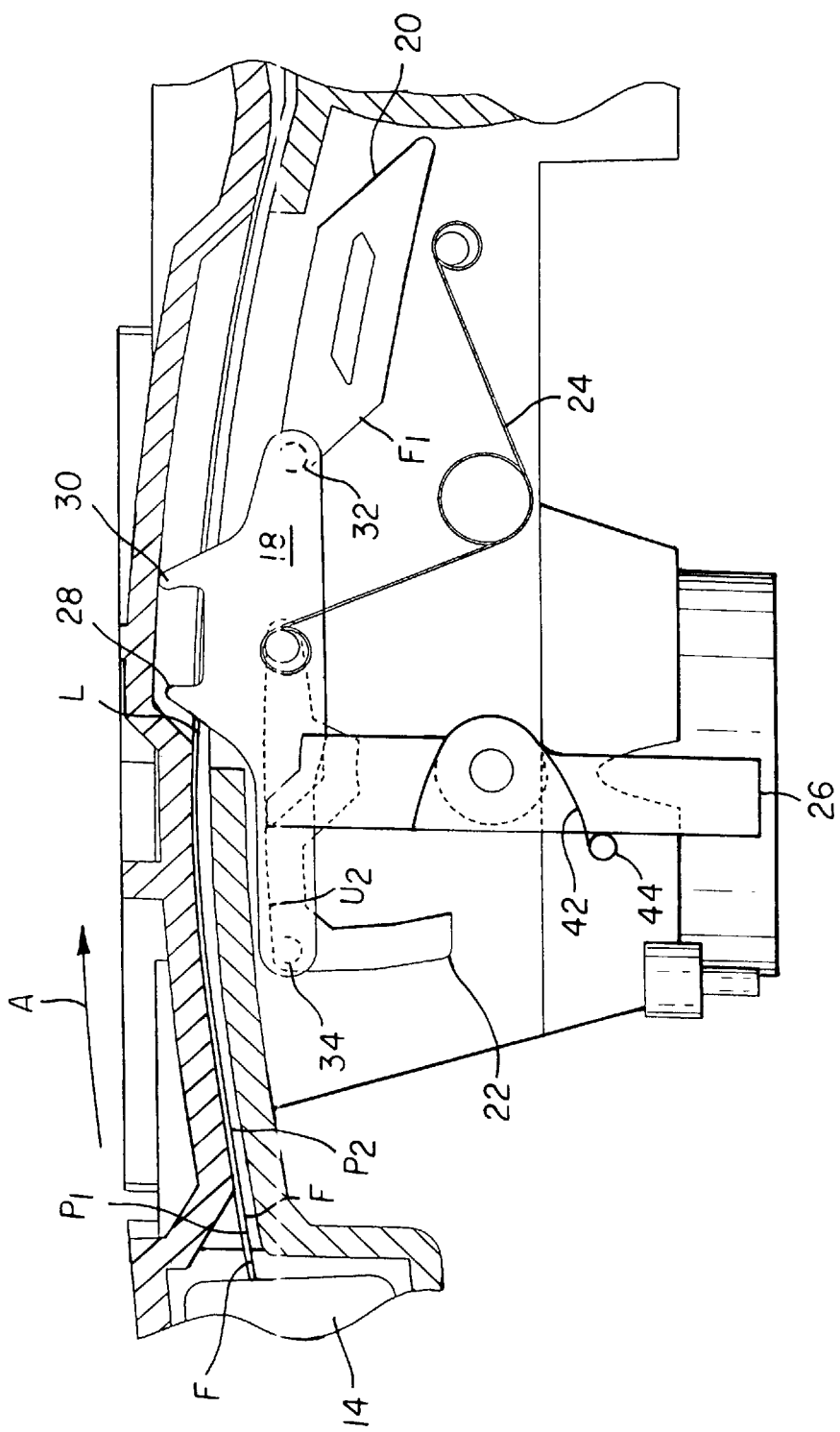
FIGS. 5(a)–5(d) are partial top views of the camera body shown in FIG. 2 serially illustrating an initial positioning of a film strip.
Figure 5B:
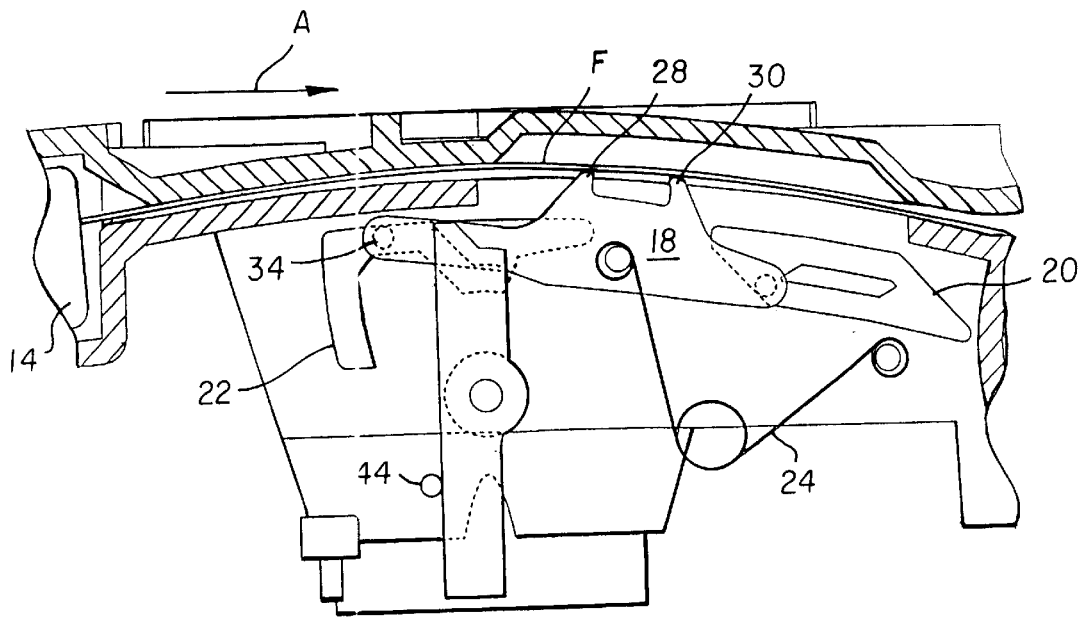
Figure 5C:
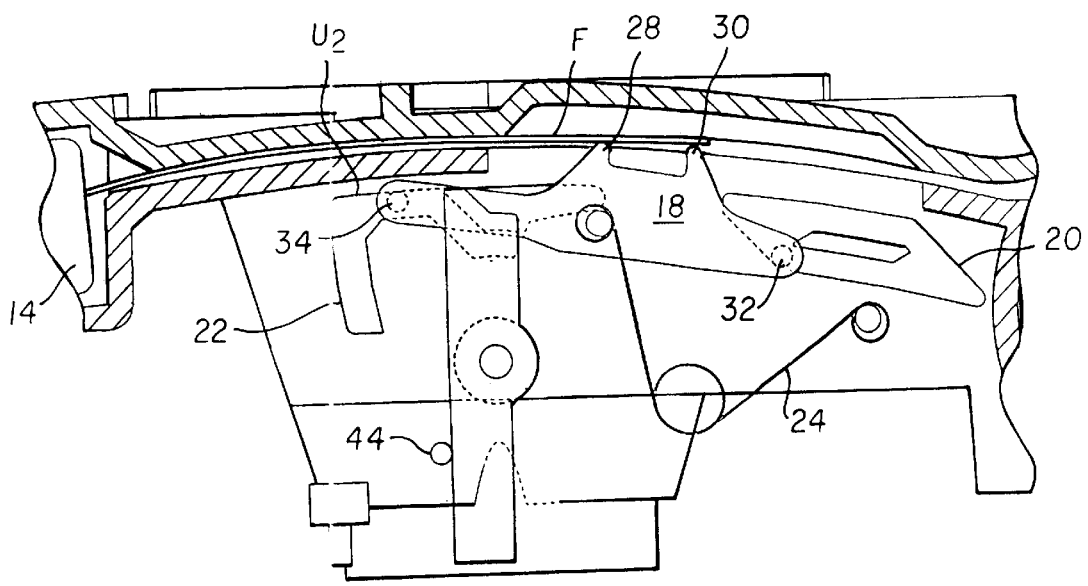

Thrusting of the filmstrip to initially position the filmstrip within the camera is generally shown in FIGS. 5(a)–5(d). Filmstrip F is advanced from first chamber 14 along the film transport path in an advancing direction depicted by arrow A. As shown in FIG. 5(a), metering member 18 is biased by resilient member 24 such that sensing tooth 28 and metering tooth 30 are disposed in the film transport path. As a leading edge L of the filmstrip is advanced and contacts sensing tooth 28, as illustrated in FIG. 5(b), metering member 18 overcomes the biasing force provided by resilient member 24. Consequently, metering member 18 (including sensing tooth 30 and metering tooth 32) are withdrawn from the film transport path, and the filmstrip advances along the film transport path toward second chamber 16, as shown in FIG. 5(c), until sensing tooth 28 and metering tooth 30 engage perforations $P_1, P_2$.

Figure 5D:
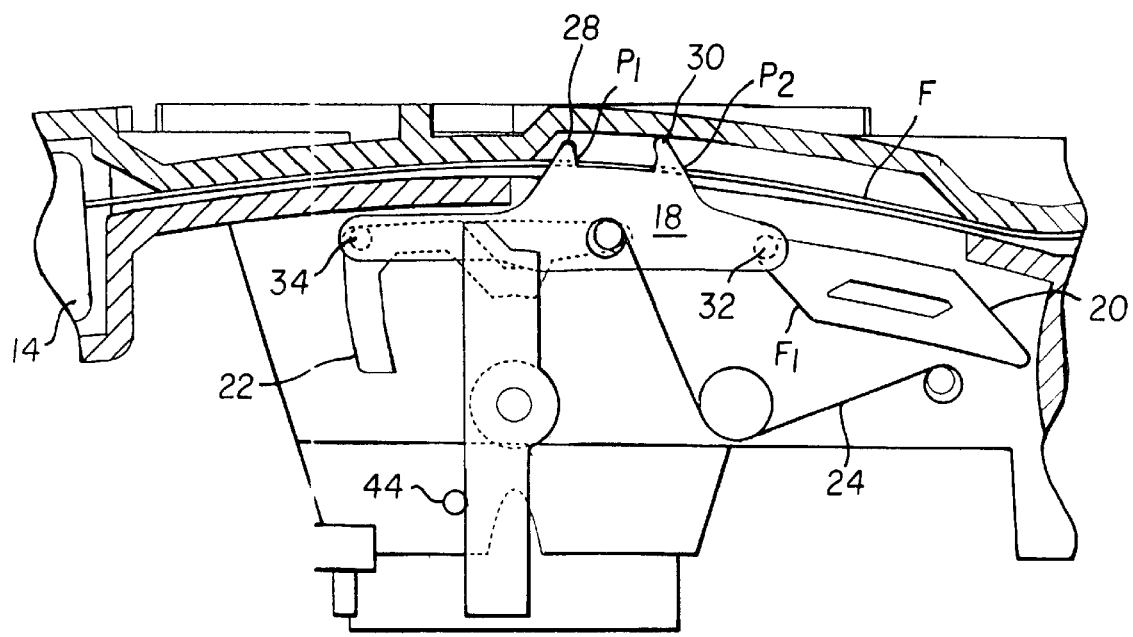

As illustrated in FIGS. 5(b)–5(d), the movement of metering member 18 is permitted by first and second tracking pins 32,34 sliding and pivoting along first and second tracks 20,22, respectively. First tracking pin 32 slides along front surface $F_1$ of first track 20 while second tracking pin 34 slides along upper surface $U_2$ of second track 22.

During the initial positioning of the filmstrip, demetering lever 26 is positioned in its rest position against stop member 44.

Metering of the Filmstrip

Figure 6A:
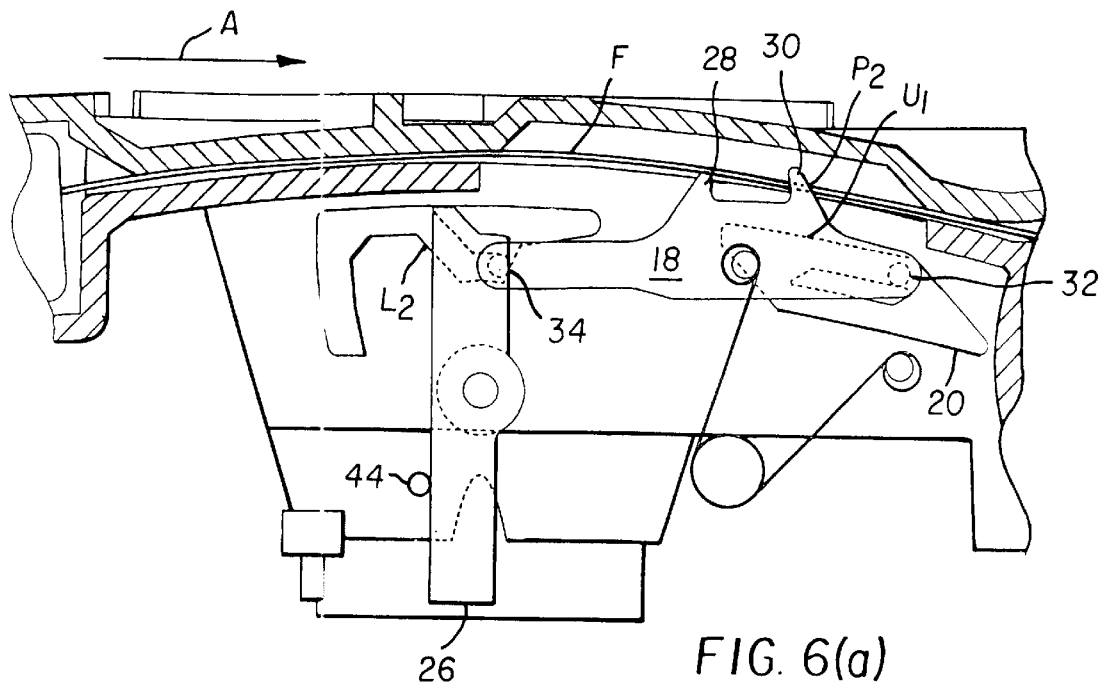
FIGS. 6(a)–6(f) are partial top views of the camera body shown in FIG. 2 serially illustrating metering of a film strip.

With the filmstrip in the initial position, as illustrated in FIG. 5(d), the filmstrip is further advanced in the advancing direction A by manual or automatic means (not shown) to a metered position shown in FIG. 6(a). In this metered position, metering tooth 30 engages perforation $P_2$ while sensing tooth 28 is spaced from the film strip. As illustrated in FIG. 6(a), first tracking pin 32 is disposed along upper surface $U_1$, of first track 20. Second tracking pin 34 is disposed along lower surface $L_2$ and abuts blocking surface 40 of demetering lever 26 to form a self-lock. As such, demetering lever 26 retains metering member 18 in the metering position illustrated in FIG. 6(a).

Figure 6B:
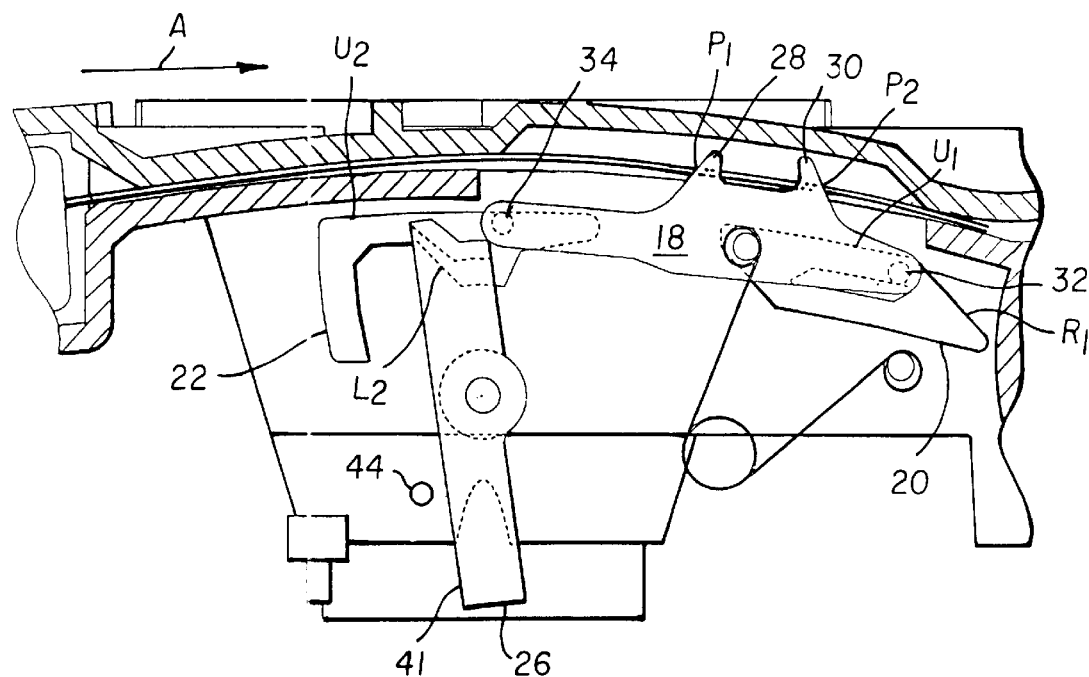

Referring now to FIG. 6(b), to advance the filmstrip, demetering lever 26 is actuated by manual or automatic actuating means (not shown) at actuating surface 41, and rotates counterclockwise. The actuation of demetering lever 26 releases second tracking pin 34 from lower surface $L_2$ to contact upper surface $U_2$. The angular surface of lower surface $L_2$ facilitates the release. This movement of second tracking pin 34 rotates metering member 18 whereby sensing tooth 28 engages perforation $P_1$. As such, both perforations $P_1, P_2$ are engaged. Demetering lever 26 returns to its rest position upon release of the (manual or automatic) actuating means (not shown).

Figure 6C:
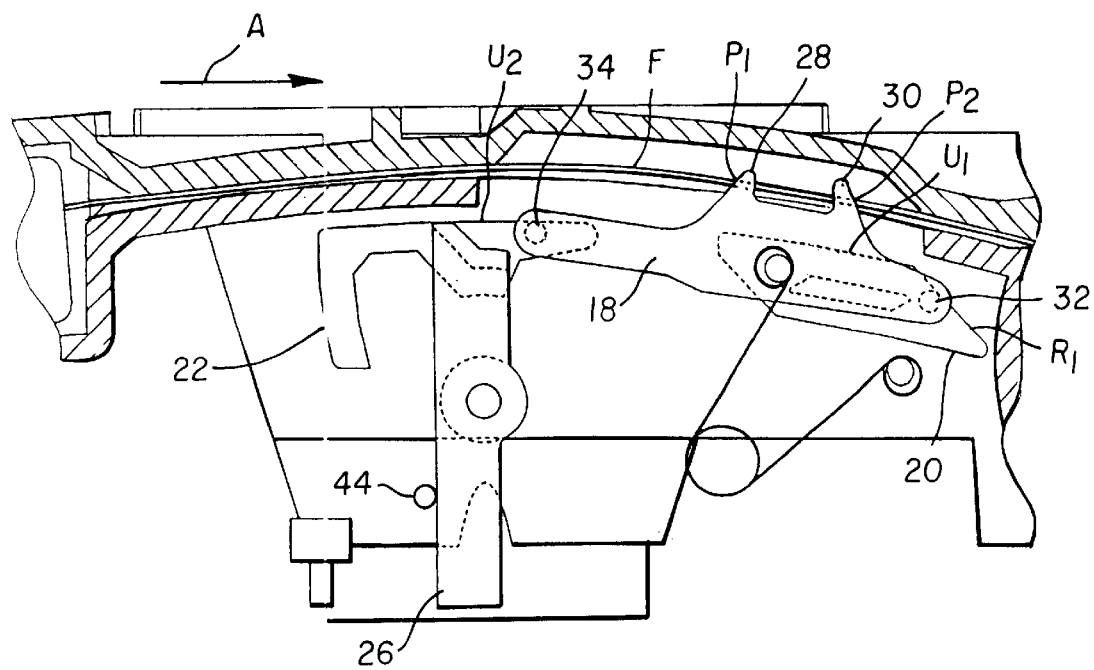

The filmstrip is advanced, manually or automatically by means not shown, along the film transport path in direction A, causing metering member 18 to move through the positive engagement of the sensing tooth and metering tooth with perforations $P_1, P_2$. First tracking pin 32 moves along upper surface $U_1$ and a rear surface $R_1$ of first track 20, as illustrated in FIG. 6(c), while second tracking pin 34 moves along upper surface $U_2$ of second track 22.

Figure 6D:
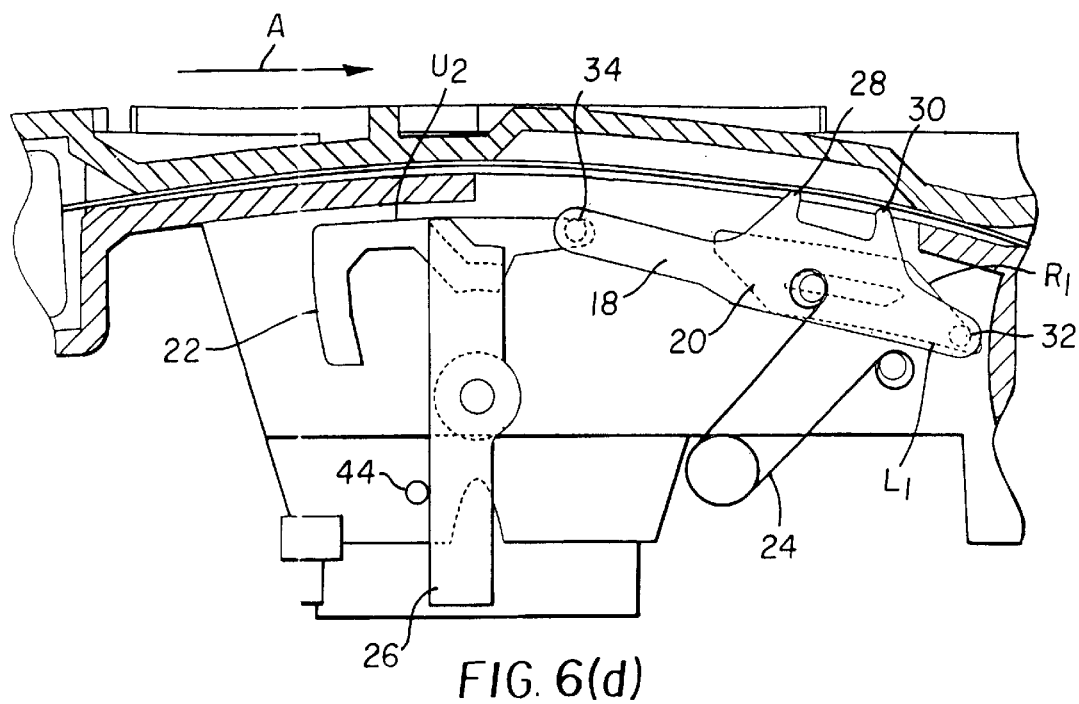

Referring now to FIG. 6(d), as metering member 18 is moved by the filmstrip, first tracking pin 32 moves to rear surface $R_1$ adjacent lower surface $L_1$, and second tracking pin 34 moves along upper surface $U_2$. In this orientation, metering member 18 rotates such that sensing tooth 28 and metering tooth 30 disengage with perforations $P_1, P_2$, respectively. The sloped surfaces of the sensing tooth and metering tooth along with the movement of the metering member provide for the disengagement of the teeth with the filmstrip.

Figure 6E:
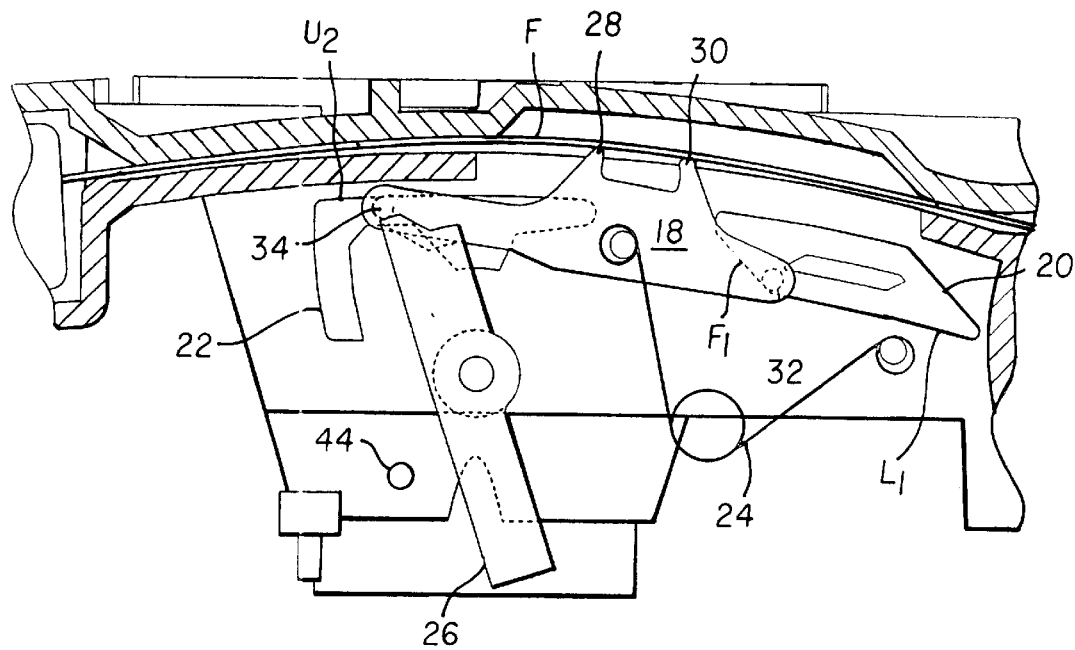
Figure 6F:
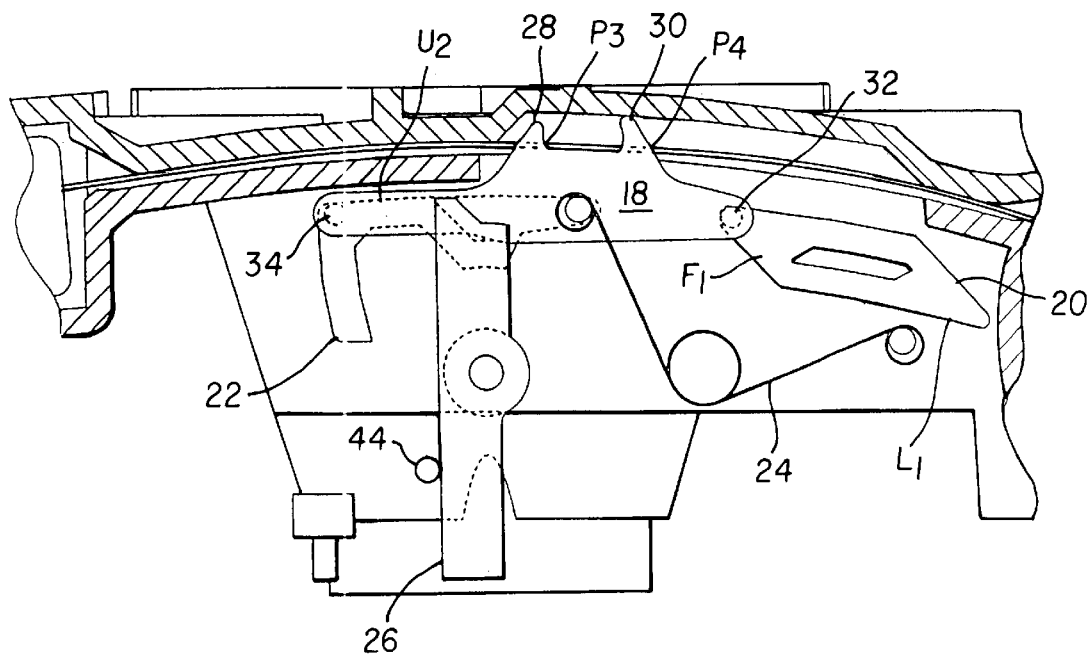

With the sensing tooth and metering tooth disengaged from the filmstrip, the biasing force by resilient member 24 biases metering member 18 toward the film transport path. As shown in FIGS. 6(e) and 6(f), first tracking pin 32 moves first along lower surface $L_1$ of first track 20 and then along front surface $F_1$. Second tracking 34 moves along upper surface $U_2$ of second track 22. Demetering lever 26 moves to permit second tracking pin 34 to continue movement along upper surface $U_2$. Metering member 18 is biased toward the film transport path where sensing tooth 28 and metering tooth 30 engage another set of perforations $P_3, P_4$.

FIG. 6(f) illustrates metering member 18 oriented in the initial position for metering (as previously shown in FIG. 5(d)), and the metering operation can be repeated as described above with regard to FIGS. 6(a) through 6(f).

Rewinding of the Filmstrip

Figure 7A:
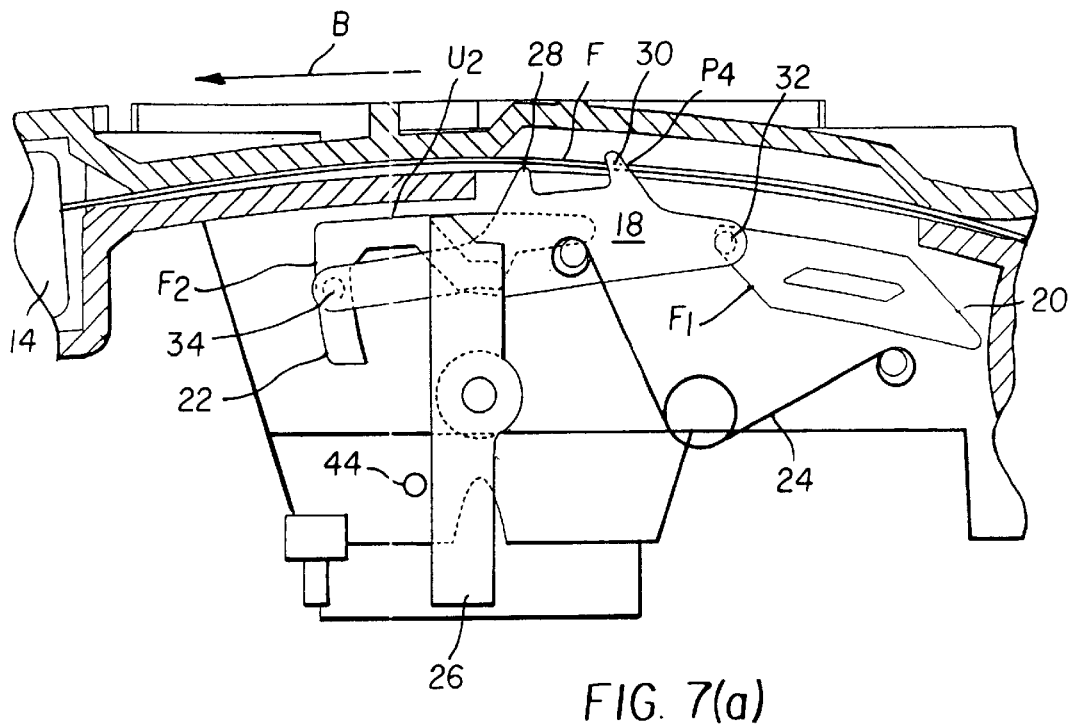
FIGS. 7(a)–7(b) are partial top views of the camera body shown in FIG. 2 serially illustrating rewinding of a film strip.
Figure 7B:
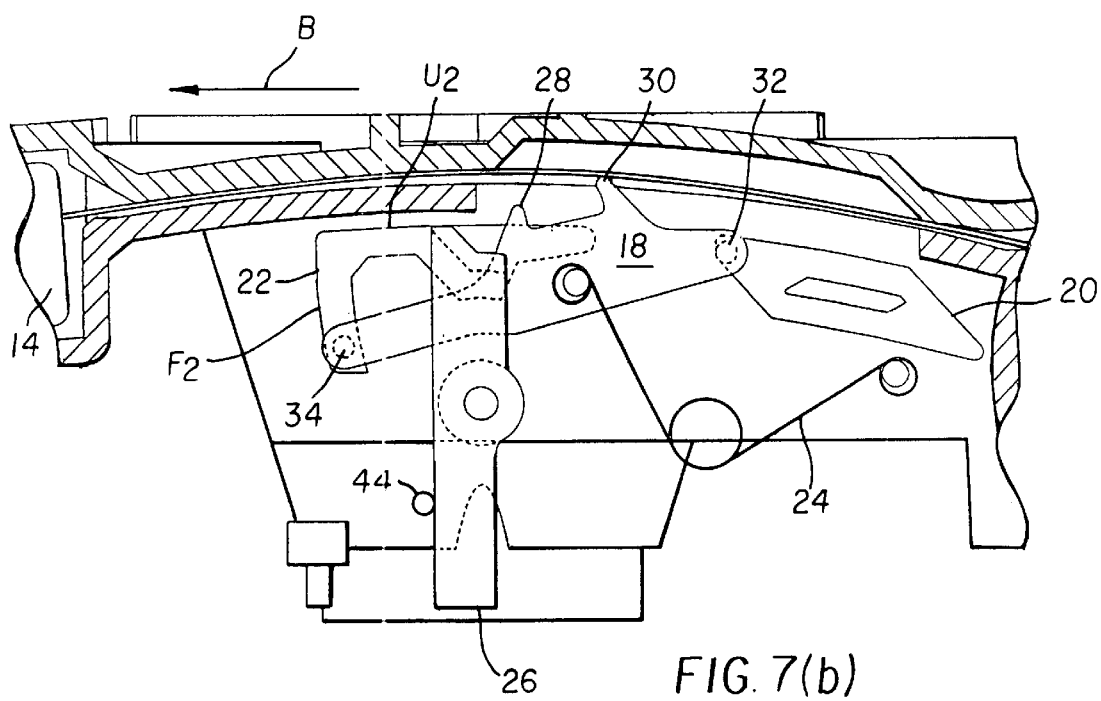

FIGS. 7(a) and 7(b) illustrate the movement of the metering apparatus permitting the filmstrip to be rewound into first chamber 14. The filmstrip is transported along the film transport path in a rewind direction depicted by arrow B, opposite to that of the film advancing direction A. The film transport is accomplished by means not shown, for example, by the rotation of a film rewind knob.

Metering apparatus is positioned in the initial position as illustrated in FIG. 6(f) wherein sensing tooth 28 and metering tooth 30 are engaged with perforations $P_3, P_4$, first tracking pin 32 is disposed along the front surface $F_1$ of first track 20, and second tracking pin 34 is disposed along the upper surface $U_2$ of second track 22. Referring now to FIG. 7(*a*), as the filmstrip is advanced in rewind direction B, the movement of the filmstrip causes metering member 18 to pivot about first tracking pin 32. Second tracking pin 34 moves within a segment of track 22 adjacent front surface $F_2$, which provides clearance for second tracking pin 34. The pivoting motion of metering member 18 allows sensing tooth to disengage from perforation $P_3$. Further pivoting motion about first tracking pin 32 allows metering tooth 30 to disengage from perforation $P_4$, as illustrated in FIG. 7(*b*). With metering member 18 being disengaged from the filmstrip, the rewind operation is accomplished. When the filmstrip is completely rewound into chamber 14, the biasing force of resilient member 24 biases the metering member into the film transport path, as previously illustrated in FIG. 5(*a*).

Figure 8:
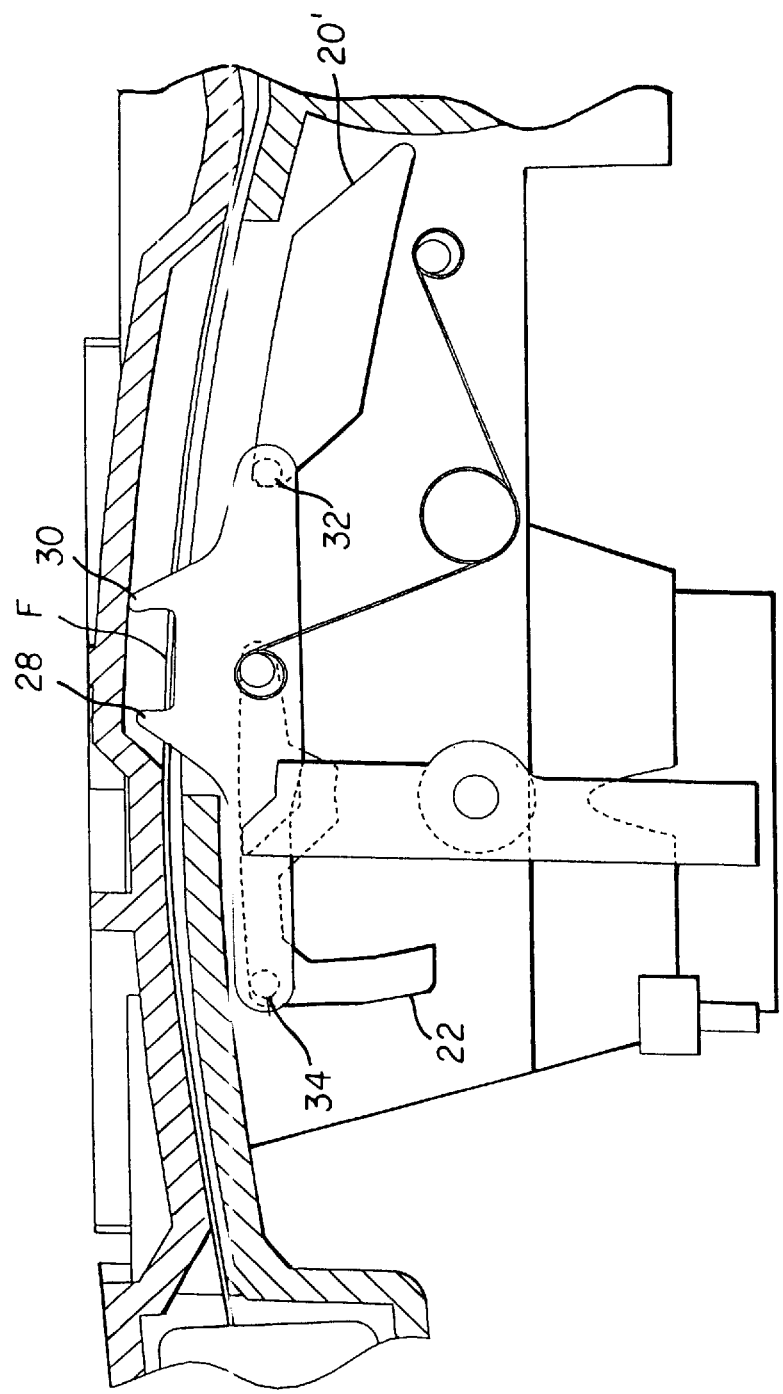
FIG. 8 shows a partial top view of the camera body shown in FIG. 2 illustrating a first track which is not a continuous loop.

First track 20 is preferably defined as being a continuous loop. However, Applicants note that first track need not be a continuous loop; first track 20 may be defined as a slot or channel 20' as shown in FIG. 8.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An apparatus for metering a strip of film along a film transport path in a camera, comprising:

a first and second stationary track;

a movable metering member having a tooth adapted to engage a perforation disposed on the strip of film;

a first and second tracking pin disposed on the metering member engaging the first and second track, respectively, for slidable and pivotable movement therealong; and a resilient member biasing the metering member toward the film transport path.

2. The apparatus according to claim I wherein the first track defines a continuous loop.

3. The apparatus according to claim I wherein the second track does not define a continuous loop.

4. An apparatus for metering a strip of film along a film transport path, comprising:

a first stationary track defining a continuous loop;

a second stationary track spaced from the first track;

a movable metering member having a sensing tooth and a metering tooth adapted to engage perforations disposed on the strip of film;

a first and second tracking pin on the metering member engaging the first and second track, respectively, for slidable and pivotable movement therealong such that the sensing tooth and metering tooth engages and disengages with the perforations; and a resilient member biasing the metering member in a first position toward the film transport path.

5. The apparatus according to claim 4 wherein the sensing tooth and the metering tooth each have at least one sloped surface, the sloped surfaces being directed toward each other.

6. The apparatus according to claim 5 wherein the metering tooth further includes a second sloped surface.

* * * * *